United States Patent
Avasiloaie

(10) Patent No.: US 9,771,052 B2
(45) Date of Patent: Sep. 26, 2017

(54) UNIVERSAL COUPLER ASSEMBLY AND WIPER ASSEMBLY INCORPORATING THE SAME

(71) Applicant: TRICO PRODUCTS CORPORATION, Rochester Hills, MI (US)

(72) Inventor: Valentin Avasiloaie, Dearborn Heights, MI (US)

(73) Assignee: Trico Products Corporation, Rochester Hills, MI (US)

( * ) Notice: Subject to any disclaimer, the term of this patent is extended or adjusted under 35 U.S.C. 154(b) by 196 days.

(21) Appl. No.: 14/321,872

(22) Filed: Jul. 2, 2014

(65) Prior Publication Data
US 2015/0013094 A1    Jan. 15, 2015

Related U.S. Application Data

(60) Provisional application No. 61/842,057, filed on Jul. 2, 2013.

(51) Int. Cl.
*B60S 1/38* (2006.01)
*B60S 1/40* (2006.01)

(52) U.S. Cl.
CPC ........... *B60S 1/4003* (2013.01); *B60S 1/3853* (2013.01); *B60S 1/3889* (2013.01); *B60S 1/4038* (2013.01); *B60S 1/4045* (2013.01); *B60S 2001/4012* (2013.01); *B60S 2001/4022* (2013.01); *B60S 2001/4032* (2013.01)

(58) Field of Classification Search
CPC ...... B60S 1/3863; B60S 1/387; B60S 1/4038; B60S 1/4045; B60S 1/3851; B60S 2001/4032
See application file for complete search history.

(56) References Cited

U.S. PATENT DOCUMENTS

| 2,876,482 | A | | 3/1959 | Oishei |
| 3,007,190 | A | * | 11/1961 | Ryck .......... B60S 1/40 |
| | | | | 15/250.32 |
| 4,418,441 | A | | 12/1983 | van den Berg |

(Continued)

FOREIGN PATENT DOCUMENTS

| DE | 10 2009 014 700 A1 | 10/2009 | |
| DE | 102011007247 A1 * | 10/2012 | ........... B60S 1/3858 |

(Continued)

OTHER PUBLICATIONS

Nov. 11, 2014 International Search Report and Written Opinion for PCT/US2014/045238.

*Primary Examiner* — Michael Jennings
(74) *Attorney, Agent, or Firm* — Miller Canfield

(57) ABSTRACT

A universal coupler assembly for a wiper assembly includes a carrier adapted to be mounted to the wiper assembly and a saddle that is removably received and retained by the carrier. The saddle is slideably mounted in a side of the carrier and includes a locking mechanism to provide releasable engagement with the carrier. The carrier and saddle cooperate to accommodate various sizes of "pinch-type" wiper arm attachment members, "push-button-type" attachment members, as well as "side-pin-type" and "pin-and-bent-tab-type" attachment members that are used to connect the wiper arm and the wiper assembly.

12 Claims, 6 Drawing Sheets

(56) References Cited

U.S. PATENT DOCUMENTS

| | | | |
|---|---|---|---|
| 5,611,103 A | 3/1997 | Lee | |
| 5,618,124 A | 4/1997 | Chen | |
| 6,654,983 B1 | 12/2003 | Raynaud | |
| 7,523,522 B2 | 4/2009 | Herring et al. | |
| 7,587,783 B1 | 9/2009 | Lin | |
| 7,669,276 B2 | 3/2010 | Verelst et al. | |
| 7,774,892 B2 | 8/2010 | Coughlin | |
| 8,042,218 B2 * | 10/2011 | Moll | B60S 1/3856 15/250.001 |
| 8,261,403 B2 * | 9/2012 | Ehde | B60S 1/3863 15/250.32 |
| 8,381,349 B2 * | 2/2013 | Ku | B60S 1/3853 15/250.32 |
| 2005/0028312 A1 * | 2/2005 | Coughlin | B60S 1/4003 15/250.32 |
| 2006/0218740 A1 | 10/2006 | Coughlin | |
| 2007/0067941 A1 | 3/2007 | Huang | |
| 2008/0078051 A1 | 4/2008 | Herring et al. | |
| 2008/0163448 A1 | 7/2008 | Yang et al. | |
| 2009/0199357 A1 | 8/2009 | Thienard | |
| 2010/0005609 A1 | 1/2010 | Kim | |
| 2010/0050361 A1 | 3/2010 | Chang et al. | |
| 2010/0205763 A1 | 8/2010 | Ku | |
| 2011/0277265 A1 | 11/2011 | Ehde | |
| 2012/0060315 A1 | 3/2012 | Avasiloaie et al. | |
| 2012/0060316 A1 * | 3/2012 | Avasiloaie | B60S 1/381 15/250.33 |
| 2014/0130282 A1 * | 5/2014 | Avasiloaie | B60S 1/3851 15/250.32 |

FOREIGN PATENT DOCUMENTS

| | | | |
|---|---|---|---|
| DE | 102011007248 A1 * | 10/2012 | ............ B60S 1/3858 |
| FR | 2760217 A1 * | 9/1998 | ................ B60S 1/38 |
| FR | 2 924 079 A1 | 5/2009 | |
| KR | 10 2007 0096733 A | 10/2007 | |
| WO | 2010/028866 A1 | 3/2010 | |
| WO | 2012/037211 A2 | 3/2012 | |

* cited by examiner

UNIVERSAL COUPLER ASSEMBLY AND WIPER ASSEMBLY INCORPORATING THE SAME

CROSS REFERENCE TO RELATED APPLICATIONS

This application claims the benefit of U.S. provisional patent application entitled "Universal Coupler Assembly for Wiper Assembly," having Ser. No. 61/842,057, and filed on Jul. 2, 2013.

BACKGROUND OF THE INVENTION

1. Field of the Invention

The present invention relates generally to wiper assemblies and, more specifically, to a universal coupler assembly for a wiper assembly for use in connecting the wiper assembly to various styles of wiper arms.

2. Description of the Related Art

Wiper assemblies known in the related art include two categories commonly referred to as, "tournament" wipers and "beam blade" style wipers. In either category, the wiper assembly is removably connected to a wiper arm of a vehicle. Specifically, a wiper coupler is employed to facilitate the connection between the wiper assembly and an attachment member of the wiper arm.

At the manufacturing level, there is usually not much concern over compatibility between the wiper assemblies and the wiper arm since these components are typically supplied to OEM vehicle manufacturers as a part of an overall wiper system. However, windshield wiper assemblies wear out and must be replaced. Typically, the wiper coupler for the wiper assembly is designed solely for use in connection with a single style of wiper arm attachment member. In the aftermarket, compatibility between the wiper arm and wiper assembly is a problem. End users are provided with few, if any, options for replacement wiper assemblies and are often required to purchase replacement wiper assemblies from dealerships for the OEM vehicle manufacturer.

As a result of the limited aftermarket availability and limited options associated with the wiper assemblies, there is a need in the art for a universal coupler assembly for a wiper assembly that operatively couples the wiper assembly to several different wiper arm attachment members.

SUMMARY OF THE INVENTION

The present invention overcomes the limitations and disadvantages in the related art in a universal coupler assembly for a wiper assembly. The universal coupler assembly includes a carrier adapted to be mounted to the wiper assembly and a saddle that is removably received and retained by the carrier. The saddle is slideably mounted in a side of the carrier and includes a locking mechanism to provide releasable engagement with the carrier. The carrier and saddle cooperate to accommodate various sizes of "pinch-type" attachment members, "push-button-type" attachment members, as well as "side-pin-type" and "pin-and-bent-tab-type" attachment members that are used to connect the wiper arm and the wiper assembly.

Thus, one advantage of the present invention is that it provides a universal coupler assembly for a wiper assembly that is adapted to releasably engage several different wiper arm attachment members, thereby reducing the need for several different wiper assemblies at the OEM level. Another advantage of the present invention is that the universal coupler provides an interchangeable universal coupler assembly that can engage several different wiper arm attachment members, thereby reducing the need for multiple aftermarket replacement wiper assemblies having the same superstructure but a different, single-application, coupler assembly to reduce the costs associated with point-of-sale packaging and replacing a wiper assembly. Yet another advantage of the present invention is that the universal coupler assembly provides ease of assembly and disassembly of various adaptors.

Other objects, features, and advantages of the present invention will be readily appreciated as the same becomes better understood after reading the subsequent description taken in connection with the accompanying drawings.

DESCRIPTION OF THE PREFERRED EMBODIMENT(S)

Figure 1:
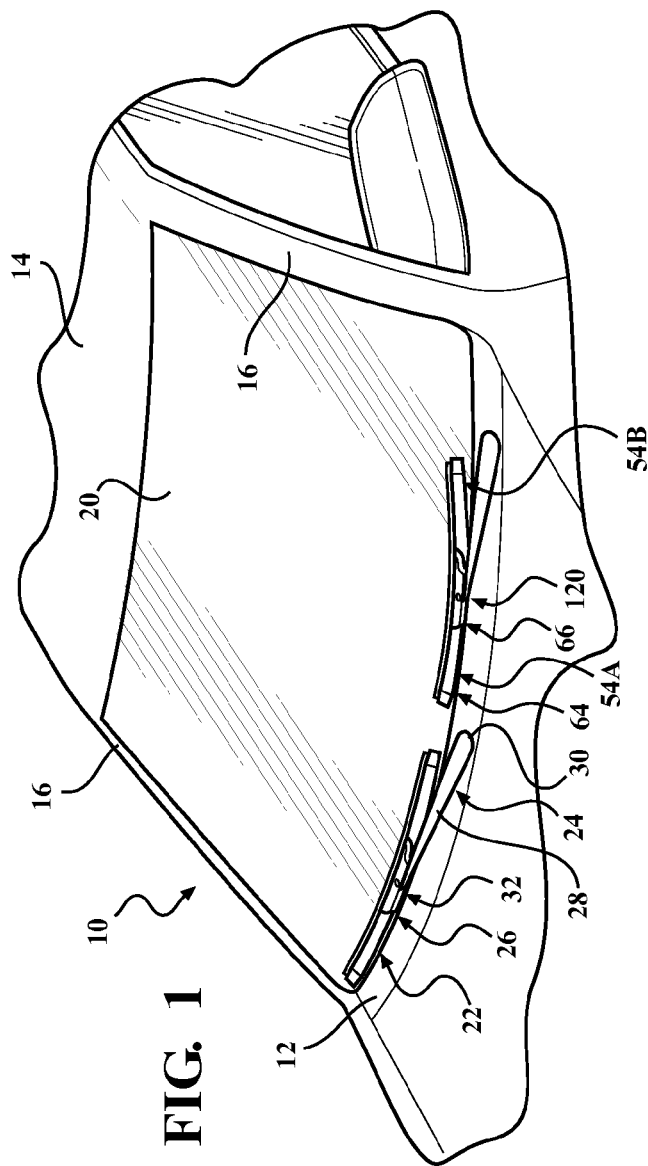
FIG. 1 is a partial perspective view of a front of a vehicle having a pair of wiper assemblies that are pivotally mounted for reciprocal movement across a windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to form an opening 18 to support a curved or "swept back" glass windshield 20 located therebetween.

A wiper system is generally indicated at 22 in FIG. 1 and is employed to clean the glass windshield 20. The wiper system 22 includes a wiper arm, generally indicated at 24 and a wiper assembly, generally indicated at 26 and according to one embodiment of the present invention. The wiper assembly 26 is releasably engaged to the wiper arm 24 and adapted to clean the surface to be wiped, namely a windshield 20. Those having ordinary skill in the art will appreciate that the wiper system 22 may include more than one wiper arm 24 and wiper assembly 26. By way of example and as indicated in FIG. 1, a wiper system 22 may include a pair of wiper arms 24 and wiper assemblies 26, which correspond to the driver and passenger side of the vehicle 10. Furthermore, those having ordinary skill in the art will appreciate that wiper assemblies 26 may be employed in other areas of a vehicle 10, such as a rear window (not shown) or a head lamp (not shown) that employs a wiper system 22. Thus, it will be understood that the present invention is not limited for use solely in connection with wiper arms 24 adjacent to a vehicle's windshield 20, but for use in all applications where wiper assemblies 26 are employed.

The wiper arm 24 includes an elongate body 28 having a pivot end 30 that is operatively engaged to a motor (not shown) that drives the wiper arm 24 in an oscillating manner across the windshield 20. More specifically, the elongate body 28 is operatively attached to the pivot end 30 in a hinged manner to enable a person to elevate the elongate body 28 away from the windshield 20. Articulation between the pivot end 30 and elongate body 28 in this manner is conventionally known to enable maintenance or inspection of the wiper system 22 and/or windshield 20 as well as for removal and installation of wiper assemblies 26. Those having ordinary skill in the art will appreciate that the wiper arm 24 may further include a biasing member to impart a downward force through the wiper arm 24 and onto the wiper assembly 26 to facilitate contact between the wiper assembly 26 and the windshield 20 of the vehicle 10. By way of example, the biasing member may include a spring. It should further be appreciated that the elongate body 28 of the wiper arm 24 may include a cavity adjacent to the pivot end 30 to operatively receive the biasing member.

As illustrated in FIG. 1, the wiper arm 24 further includes an attachment member, generally indicated at 34, that extends from the elongate body 28. The attachment member 34 may be of a pinch-tab type, a pin-and-bent-tab type, or a push-button type that are commonly employed in the related art. Pinch-tab type, push-button type and pin-and-bent-tab type attachment members have been traditionally employed for connection to a wiper assembly having a fixed coupler assembly that restricts use of the wiper assembly to a single type of wiper arm attachment member. However, the present invention provides a removable/interchangeable, universal coupler assembly that facilitates the use of a wiper assembly in connection with several different wiper arm attachment members.

Figure 2:
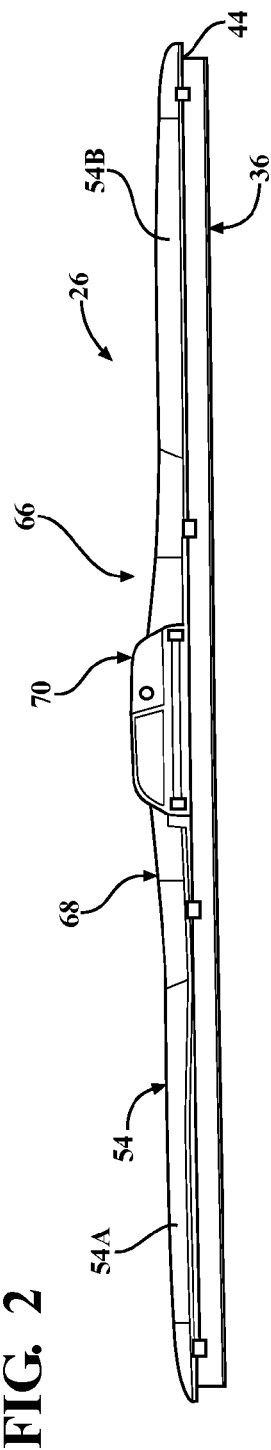
FIG. 2 is a front elevational view of one of the wiper assemblies of FIG. 1, according to one embodiment of the present invention.
Figure 3:
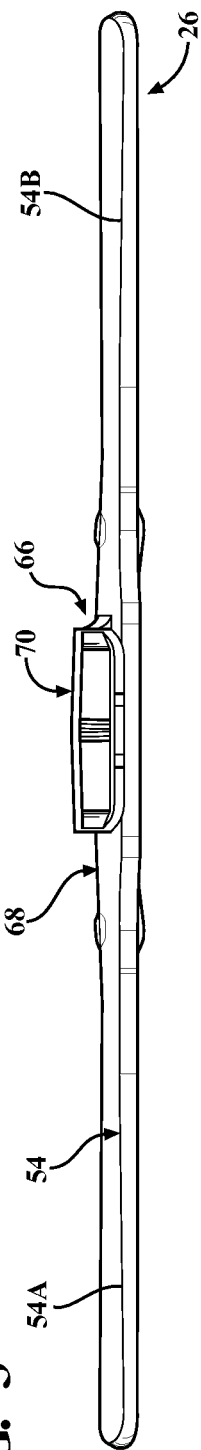
FIG. 3 is a top view of one of the wiper assemblies of FIG. 1, according to one embodiment of the present invention.
Figure 4:
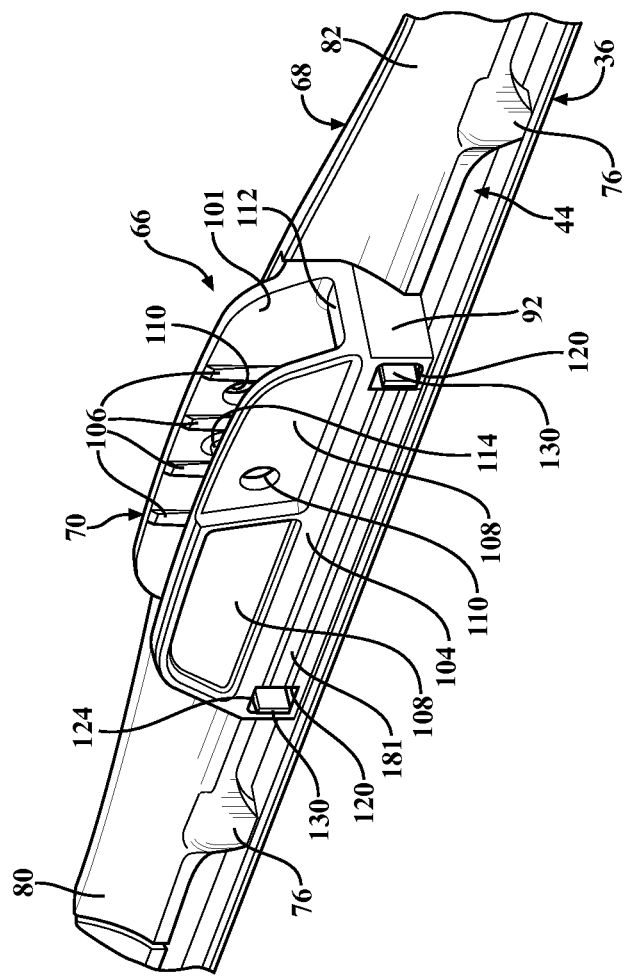
FIG. 4 is a perspective view of a universal coupler assembly, according to one embodiment of the present invention, for the wiper assembly of FIGS. 2 and 3.
Figure 5:
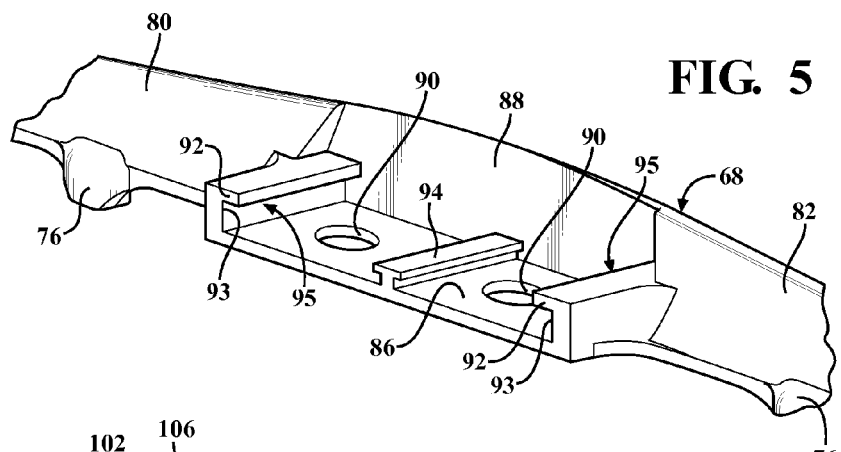
FIG. 5 is perspective view of a carrier of the universal coupler assembly of FIG. 4.

Referring to FIGS. 1-3, the wiper assembly 26 includes a wiping element, generally indicated at 36, that is adapted to contact the surface of the vehicle 10 to be wiped, in this representative example, the windshield 20. The wiping element 36 includes an upper section and a lower section that are segmented by a longitudinally extending partition. The partition provides flexibility between the upper section and lower section during operational movement of the wiper assembly 26. The upper section is adapted to facilitate attachment to additional components of the wiper assembly 26, as described in greater detail below, while the lower section is adapted to engage the surface to be wiped.

The wiping element 36 includes a predetermined length and cross-sectional profile corresponding to a particular application and is typically manufactured through an extrusion process, which enables the length and cross-sectional profile of the wiping element 36 to be easily adjusted without a substantial increase to manufacturing expense. Furthermore, while the wiping element 36 of the present invention is constructed from a flexible rubber, those having ordinary skill in the art will appreciate that the wiping element 36 may be constructed from any flexible material, such as silicone or other polymer, and via any manufacturing process, such as injecting molding, without departing from the scope of the invention.

The wiper assembly 26 may also include an elongated beam, generally indicated at 44, that operatively engages the wiping element 36. The elongated beam 44 is adapted to distribute downward pressure from the wiper arm 24 across the wiping element 36. As a result, the elongated beam 44 includes longitudinal ends that define a predetermined length capable of facilitating distribution of the downward pressure from the wiper arm assembly 24. The elongated beam 44 further includes a top end and a bottom end disposed between the longitudinal ends. In the embodiment illustrated in the figures, the wiping element 36 is operatively engaged to the bottom end of the elongated beam 44 by an adhesive/epoxy. However, those having ordinary skill in the art will appreciate that the elongated beam 44 may be operatively engaged to the wiping element 36 by other methods such as through a slot defined within the elongated beam 44 that receives a portion of the wiping element 36. Furthermore, those having ordinary skill in the art will appreciate that the wiper assembly 26 may include more than one elongated beam 44 or rails that are operatively engaged to the wiping element 36.

The elongated beam 44 may be constructed from any resiliently flexible material, such as spring steel or a polymer that facilitates the application of force from the spring-loaded wiper arm 24 across the span of the elongated beam 44 toward the longitudinal ends. To that end, the elongated beam 44 may be curved longitudinally with a predetermined radius of curvature that is the same or greater than the plane of curvature of the windshield 20. This predetermined radius of curvature is sometimes referred to in the related art as a "free form" radius of curvature (hereinafter "windshield curvature"). Accordingly, the curvature of the elongated beam 44 may be symmetrical or asymmetrical depending on the force requirements and the contour of the windshield 20. The flexible, free form, pre-curved elongated beam 44 straightens out when the wiper arm 24 applies a force thereto to flatten the elongated beam 44 and direct the wiping element 36 to contact the windshield 20. Thus, the elongated beam 44 includes a free-form curvature that ensures force distribution on windshields having various curvatures that effects proper wrapping about the windshield 20.

The elongated beam 44 includes a substantially constant thickness and may have a constant width throughout the length between the longitudinal ends. The constant thickness is adapted to provide high lateral and torsional stiffness to avoid lateral and torsional deflection, which causes the wiping element 36 to stick/slip ("chatter") on the windshield 20 during operation. Thus, the cross-section of the elongated beam 44 is substantially uniform, which makes it easier to manufacture. More specifically, where the elongated beam 44 is constructed from metal, such as spring steel, the tools and machinery used to manufacture the elongated beam 44 are less complicated than that required to manufacture a beam having a varying thickness. Furthermore, where the elongated beam 44 is constructed from a polymer, such as a thermoplastic elastomer, the tools and extrusion process machinery are also less complicated than those employed to manufacture an elongated beam having a varying thickness. However, those having ordinary skill in the art will appreciate that the elongated beam 44 illustrated herein may include a varying thickness and/or outer profile (width) without departing from the scope of the invention. By way of example, the width and/or thickness of the elongated beam 44 may taper linearly from the beam center, sinusoidally, parabolically, or asymmetrically. Additionally, the elongated beam 44 illustrated throughout the figures is a single, integral piece of material such that it defines a solid cross-section. However, those having ordinary skill in the art will appreciate that the elongated beam 44 may be formed into a single piece or multiple pieces by a plurality of laminates.

The wiper assembly 26 may also include an airfoil, generally indicated at 54, that acts to reduce the likelihood of wind lift during operational movement across the surface to be wiped. In the representative embodiment illustrated here, the airfoil 54 includes two segments 54A and 54B that include identical structure. Accordingly, the same reference numerals will be used to describe the structure of the two segments 54A and 54B of the airfoil 54. However, those having ordinary skill in the art will appreciate that the airfoil 54 may also be constructed as a single unit.

The airfoil 54 includes a base having an attachment portion that engages the elongated beam 44. More specifically, the attachment portion of each of the segments 54A and 54B engage a portion of the top end and bottom end between the longitudinal ends, thereby joining the airfoil 54, wiping element 36 and elongated beam 44 together. Those having ordinary skill in the art will appreciate that the airfoil 54, elongated beam 44 and wiping element 36 may be joined together through other mechanisms such as bonding the airfoil 54 to the top end of the elongated beam 44 via adhesive/epoxy or by employing additional structure such as a retainer or spline that couples the wiping element 36 to the elongated beam 44 or the elongated beam 44 to the airfoil 54 without departing from the scope of the invention.

The airfoil 54 further includes a spoiler that is adapted to utilize airflow to increase downward force on to the wiper assembly 26 during operational movement across the surface to be wiped. To this end, the spoiler tapers inwardly from the base toward a terminal point to define a profile that is slightly contoured. Those having ordinary skill in the art will appreciate that the spoiler may include a symmetrical or an asymmetrical cross-sectional profile without departing from the scope of the invention. Additionally, those having ordinary skill in the art will appreciate that the airfoil 54 may include a solid-core spoiler or a hollow-core spoiler without departing from the scope of the invention. The airfoils 54A and 54B of the present invention are manufactured from a thermoplastic material and use a manufacturing process that may be the same as described above relative to the wiping element 36. However, it should be appreciated that the airfoils 54 may be manufactured using a different process and/or different material. By way of example, the airfoils 54 may be manufactured via an injection molding process using a polymer composition having greater hydrophobic properties than the materials used for manufacturing the wiping element 36.

The wiper assembly 26 may also include a pair of end caps. The end caps are adapted to operatively engage the airfoil 54. The end caps include a profile that substantially mimics the contours of the airfoil 54 to maintain the wind lift characteristics of the wiper assembly 26 and to provide an increased aesthetic value. The end caps include a closed end that covers the longitudinal ends of the elongated beam 44. The closed end prevents infiltration of water, ice, and debris between the elongated beam 44 and the airfoil 54, which may prevent proper operation of the wiper assembly 26. The closed end of the end caps may be adapted to extend beyond the longitudinal ends of the elongated beam 44 to facilitate contact between the outer extremities of the wiping element 26 and the surface to be wiped. More specifically, the end caps provide a mass increase adjacent to the longitudinal ends of the elongated beam 44 that reduce the likelihood of localized chatter along the extremities of the wiping element 26 caused by the combination of wind lift and a decrease in the force distributed to this area from wiper arm 24 via the elongated beam 44, as described above.

Figure 8:
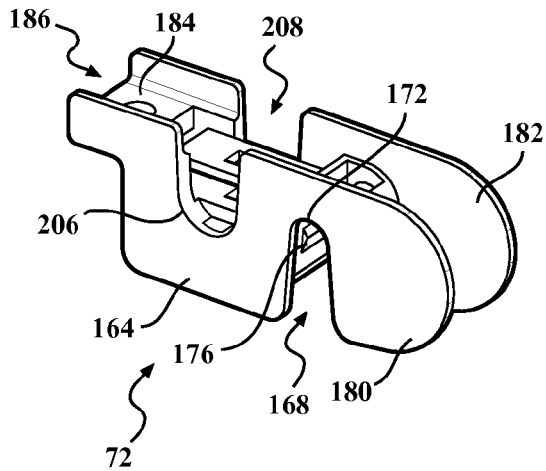
FIG. 8 is a side perspective view of the coupler of the universal coupler assembly.
Figure 9:
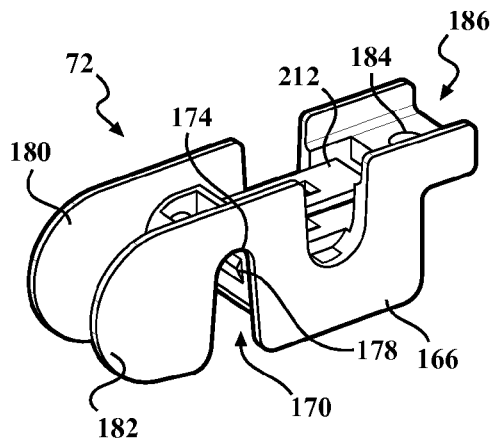
FIG. 9 is an opposite side perspective view of the coupler of the universal coupler assembly.

The wiper assembly 26 further includes a universal coupler assembly, generally indicated at 66 and according to one embodiment of the present invention. The universal coupler assembly 66 accommodates various sizes of "pinch-type" attachment members, "push-button-type" attachment members, as well as "pin-type" and "pin-and-bent-tab-type" attachment members that are used to connect the wiper arm 24 and the wiper assembly 26. To this end, the universal coupler assembly 66 includes a carrier, generally indicated at 68, and a saddle, generally indicated at 70, and a coupler, generally indicated at 72 (FIGS. 8 and 9). Each of these components will be described in greater detail below. More specifically, the carrier 68 is disposed along an intermediate position between the first and second airfoils 54A and 54B. Contrary to conventional beam blade-style wiper assemblies, which include a small contact point through which force from the wiper arm 24 is distributed, the carrier 68 broadens the initial point through which force is applied from the wiper arm 24 to the elongated beam 44. In this manner, the downward force from the wiper arm 24 is distributed with more efficiency across the elongated beam 44, thereby reducing the likelihood of wind lift and improving wiping action.

Referring to FIGS. 2-5, the carrier 68 includes an interior surface that is disposed in proximate relation to the elongated beam 44 and a plurality of transversely extending tangs 76 that are adapted to operatively engage the bottom end of the elongated beam 44. The tangs 76 cooperate with the remaining structure of the interior surface to define a track that operatively receives an intermediate portion of the elongated beam 44. In the embodiment illustrated, the carrier 68 includes four transversely extending tangs 76 to accommodate the resiliency of the elongated beam 44. In this manner, a portion of the elongated beam 44 is retained within the track, but remains able to flex in response to the curvature of the surface to be wiped. It should be appreciated that the airfoil segments 54A and 54B restrict the axial movement of the carrier 68 relative to the elongated beam 44. However, those having ordinary skill in the art will appreciate that the tangs 76 may include additional structure to prevent axial movement between the carrier 68 and the elongated beam 44. By way of example, one or more of the tangs 76 may further include a post and the elongated beam 44 may include a corresponding detent that is adapted to receive the post to prevent such axial movement of the carrier 68 relative to the elongated beam 44. Those having ordinary skill in the art will appreciate that the elongated beam 44 may be operatively attached to the carrier 68 by several methods other than as described above. By way of example, the carrier 68 may be fixed by adhesive, riveted or welded to the elongated beam 44.

The carrier 68 further includes a first end 80 that is disposed adjacent to one of the airfoil segments 54A and a second end 82 that is disposed adjacent to the other airfoil segment 54B. The first and second ends 80, 82 each include a contoured exterior surface that substantially corresponds to the contoured profile of the airfoil segments 54A and 54B. The carrier 68 includes a seat formed by a seat wall 86 that is essentially a depression formed in the top surface of the carrier 68 and a back wall 88 that extends upwardly from the seat wall 86. The seat wall 86 may include one or more apertures 90 extending therethrough to allow water to drain from the carrier 68. The carrier 68 also includes side guide members 92 extending from the seat wall 86 and back wall 88. The guide members 92 have a generally inverted "L" shape and form grooves 93 with the seat wall 86. The guide members 92 have tapered receiving slots 95 that cooperate with the saddle 70 as described in greater detail below. The carrier 68 further includes a center guide member 94 extending from the seat wall 86 and back wall 88. The center guide member 94 is generally "T" shaped. The center guide member 94 has a height less than a height of the side guide members 92. The center guide member 94 may include one or more recesses extending inwardly from the sides thereof. The seat wall 86, back wall 88, side guide members 92, and center guide member 94 are employed to locate and fix the saddle 70 relative to the carrier 68 as will be described in greater detail below.

Referring to FIGS. 4-7, the saddle 70 is shown and includes a body adapted to be cooperatively received in the seat formed by the carrier 68. To this end, the body includes a pair of opposed side walls or panels 100 spaced laterally from each other so as to define a channel 101 therebetween. The side walls 100 are generally rectangular in shape. The side walls 100 have an inner face 102 and an outer face 104. The inner face 102 has one or more ribs 106 extending vertically and spaced longitudinally. The outer face 104 has one or more recesses 108 extending laterally therein. The outer face 104 of a rear one of the side walls 100 includes a ledge wall 109 extending longitudinally therealong and laterally outward. The side walls 100 include an aperture or through-bore 110 extending laterally therethrough and aligned with each other. The aperture 110 extends through the ledge wall 109.

The body of the saddle 70 also includes a pair of opposed end walls 112 spaced longitudinally from each other and extending laterally between the side walls 100. The end walls 112 are generally rectangular in shape. The saddle 70 also includes a cross-member 114 extending laterally between the side walls 100 at a height higher than the end walls 112. The cross-member 114 is generally circular in shape. It should be appreciated that the channel, aperture, and cross-member cooperate with the coupler 72, as will be described in greater detail below.

The saddle 70 includes a center guide slot 116 extending laterally through a bottom of the side walls 100. The center guide slot 116 is generally "T" shaped to receive the center guide member 94. The saddle 70 also includes a flange 118 extending downwardly from a front one of the side walls 100 and longitudinally to act as a stop. The flange 118 includes one or more apertures 120 extending laterally therethrough. The apertures 120 are generally rectangular in shape. In the embodiment illustrated, one aperture 120 is located near each longitudinal end.

Figure 6:
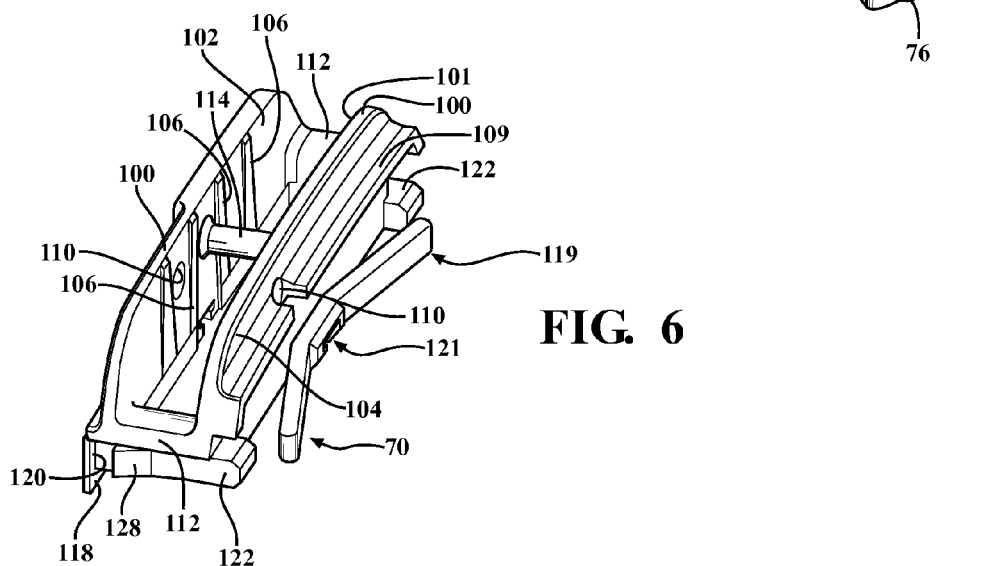
FIG. 6 is a perspective view of the saddle of the universal coupler assembly of FIG. 4.
Figure 7:
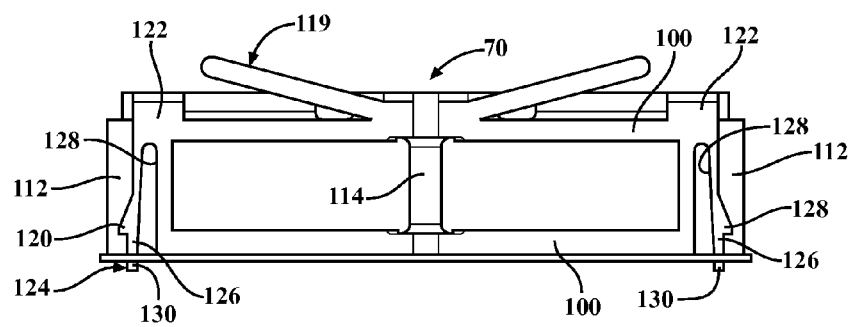
FIG. 7 is a bottom view of the saddle of the universal coupler assembly of FIG. 4.

The saddle 70 also includes a spring member 119 for engaging the back wall 88 of the carrier 68 so as to laterally bias the saddle 70 with respect to the carrier 68. Moreover, the spring member 119 compresses when the saddle 70 is engaged to the carrier 68, such that the spring member 119 pushes the saddle 70 laterally away from the carrier 68 when the saddle 70 is released from the carrier 68. As shown best in FIGS. 6 and 7, the spring member 119 has a generally bow-shaped profile. However, those having ordinary skill in the art will appreciate that the spring member 119 could be configured, formed, or shaped differently without departing from the scope of the present invention. In one embodiment, as best shown in FIG. 6, the saddle 70 includes a center guide that cooperates with the center guide member 94 of the carrier 68 so as to longitudinally support and guide the saddle 70 into the carrier 68.

The saddle 70 further includes a pair of opposed side guides 122 extending laterally and spaced longitudinally. The side guides 122 are generally rectangular in shape and are received in the grooves 93 of the side guide members 92. The saddle 70 includes a locking mechanism, generally indicated at 124, formed in the side guides 122. The locking mechanism 124 includes a pair of locking tangs 126 that extend laterally from the side guides 122. The locking tangs releasably engage the receiving slots 95 of the side guide members 92 of the carrier 68. The locking tangs 126 are formed by grooves 128 extending laterally inward into the side guides 122 such that the locking tangs 126 are cantilevered. The locking tangs 126 include a projection 128 extending longitudinally outwardly away from the side guides 122. The projection 128 is generally triangular in shape. The locking tangs 126 extend laterally through the apertures 120 a predetermined distance to form a finger 130 that may be articulated by the end user to disengage the saddle 70 from the carrier 68. In this way, the locking mechanism 124 of the saddle 70 facilitates the snap-fit attachment to the carrier 68.

Referring to FIGS. 8-12B, the universal coupler assembly 66 further includes a coupler, generally indicated at 72, that is removably attached to the saddle 70. More specifically, the coupler 72 serves as an adaptive coupling to interconnect the wiper assembly 26 to the attachment member 34 of the wiper arm 24. The present invention may be employed as part of a wiper system 22 for use with broad spectrum of vehicles produced by a diverse group of OEMs. In addition, the universal coupler assembly 66 having a coupler 72 in accordance with the present invention may be employed as a replacement part to an OEM wiper system or as a component of a wiper blade assembly replacement system.

In either event, the coupler 72 of the present invention is adapted to operatively engage the cross-member 114 located within the channel 101 of the saddle 70. To this end and with specific reference to FIGS. 8-9, the coupler 72 includes a pair of sidewalls 164 and 166 each having a nock 168 and 170, respectively, that are aligned with respect to each other. Each nock 168 and 170 has an arcuate rest 172 and 174, respectively, formed at its terminal end. The arcuate rests 172 and 174 include locking members 176 and 178, respectively, that are adapted to releasably engage the cross-member 114 of the saddle 70. In addition and as shown throughout the figures, the coupler 72 is adapted to operatively engage several different types of wiper arm attachment members 34, namely hook-type wiper arm attachment members 34A and 34B (FIGS. 11A-12B), pin-type wiper arm attachment members, and bayonet-type wiper arm attachment members.

Referring to FIGS. 11A-12B, hook-type wiper arm attachment members 34A and 34B are generally known in the related art and include a curved forward end 33A and 33B having an arcuate inner surface 35A and 35B and a terminal end 37A and 37B with an aperture 39A and 39B. The coupler 72 provides operative attachment to different styles of hook-type wiper arm attachment members 34A and 34B of varying sizes (i.e. 7 mm; 9×3; 9×4×23; 9×4×28; and 9×4×33 mm, etc.). To this end, the perimeter of each of the sidewalls 164 and 166 adjacent their respective nock 168 and 170 defines an arcuate surface 180 and 182 that acts to operatively retain at least a portion of the curved forward end 33A and 33B of a hook-type wiper arm attachment member 34A and 34B therebetween (FIGS. 11A-12B). Those having ordinary skill in the art will appreciate that while the perimeter of the sidewalls 164 and 166 adjacent the nock 168 and 170 include an arcuate surface 180 and 182, different structure that accomplishes the same end may be employed along the perimeter of the sidewalls 164 and 166. By way of example, the perimeter of the sidewalls 164 and 166 may include an octagonal surface that operatively retains a portion of a hook-type wiper arm attachment member 34A and 34B.

Figure 10:
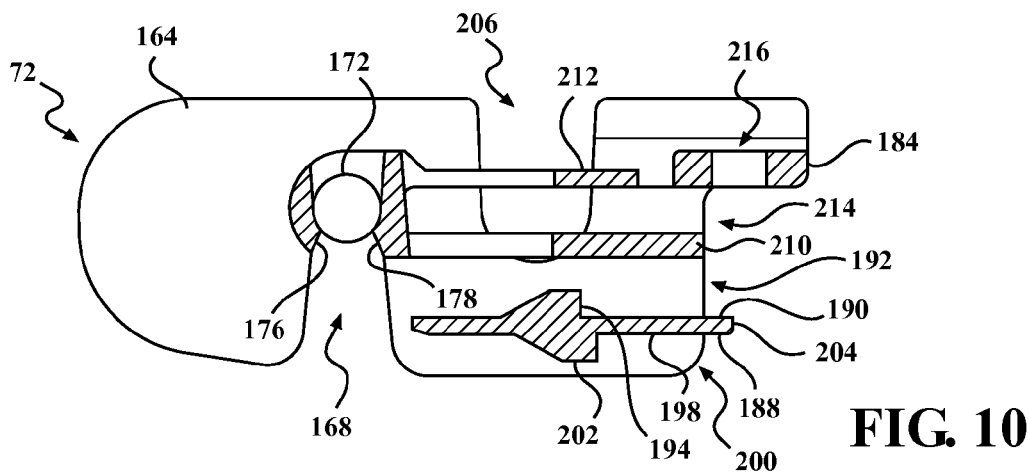
FIG. 10 is a cross-sectional side view of the coupler of the universal coupler assembly.
Figure 11A:
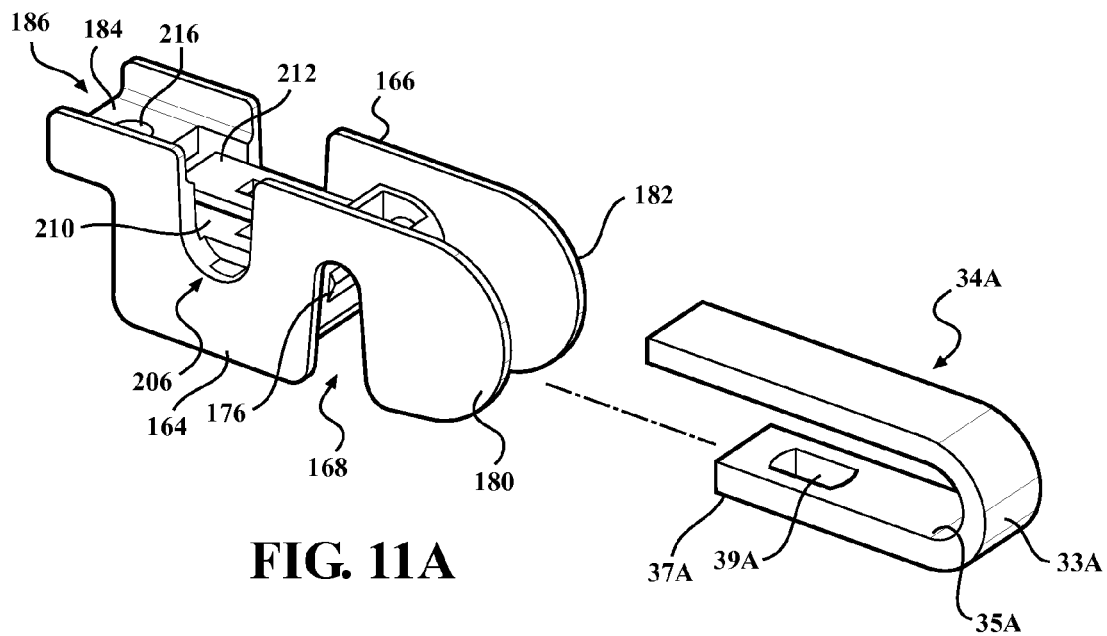
FIG. 11A is an assembly view of the coupler of the universal coupler assembly illustrating the contact location for a first hook-type wiper arm attachment member.
Figure 11B:
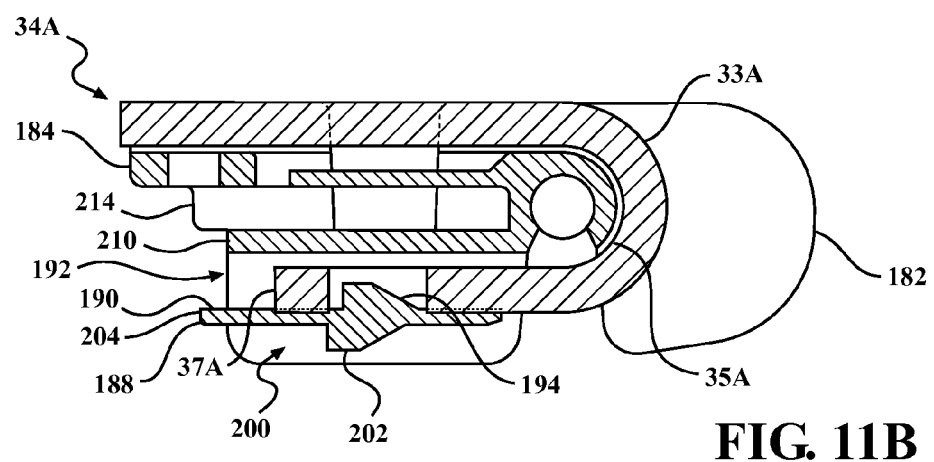
FIG. 11B is a cross-sectional side view of the coupler of the universal coupler assembly operatively engaged to the first hook-type wiper arm attachment member of the type illustrated in FIG. 11A.

Specifically referring to FIGS. 8-10, the coupler 72 includes a land 184 extending between the sidewalls 164 and 166 that cooperates with the sidewalls 164 and 166 to define a channel 186 therebetween. The adapter 72 also includes a cantilevered beam 188 extending between the sidewalls 164 and 166 in spaced parallel relation to the land 184. The cantilevered beam 188 includes a super-surface 190 that cooperates with the sidewalls 164 and 166 to define an elongate passage 192. The super-surface 190 has a catch 194 adapted to operatively engage a first hook-type wiper arm attachment member 34A (FIG. 11B). The catch 194 extends in the direction of the land 184 and is substantially wedge-shaped to facilitate efficient "slide-over" engagement with the aperture 39A of the first hook-type wiper arm attachment member 34A. Those having ordinary skill in the art will appreciate that the catch 194 may include any shape adapted to operatively engage a first hook-type wiper arm attachment member 34A.

Figure 12A:
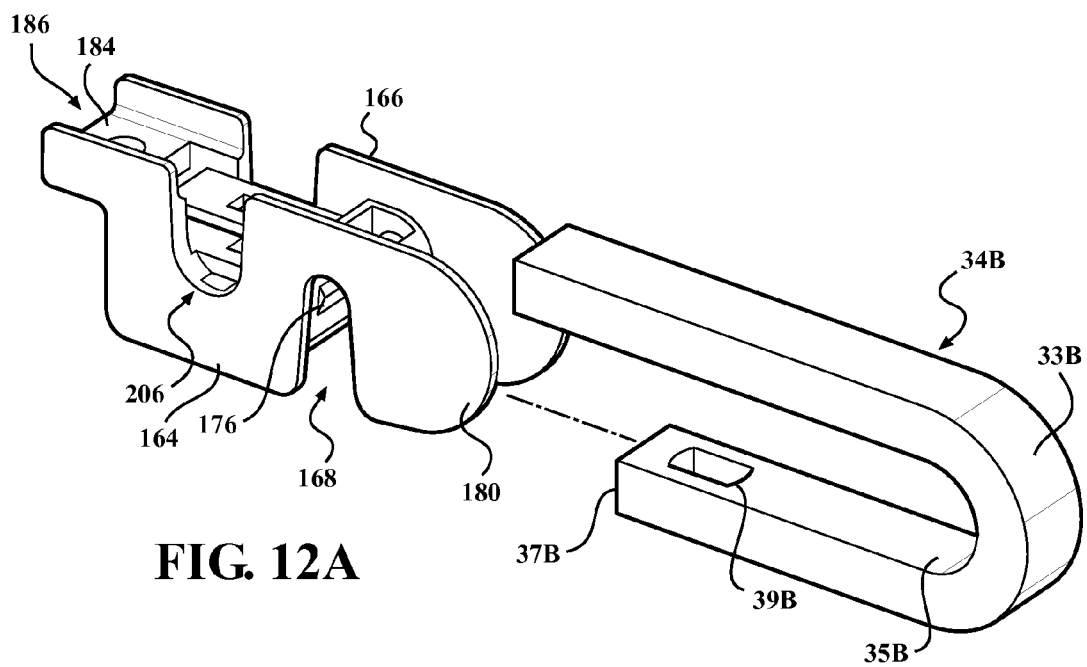
FIG. 12A is an assembly view of the coupler of the universal coupler assembly illustrating the contact location for a second hook-type wiper arm attachment member.
Figure 12B:
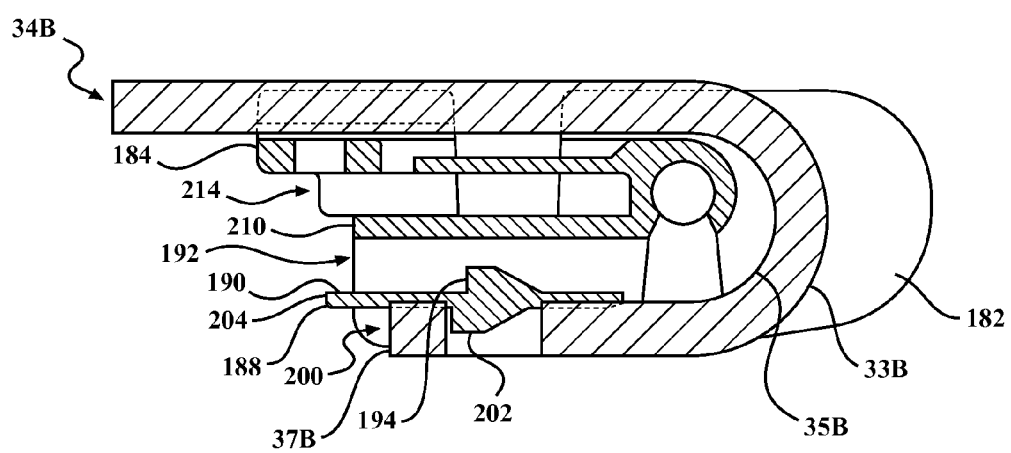
FIG. 12B is a cross-sectional side view of the coupler of the universal coupler assembly operatively engaged to the second hook-type wiper arm attachment member of the type illustrated in FIG. 12A.

Referring now to FIGS. 12A and 12B, the coupler 72 of the present invention further includes structure that operatively engages a second hook-type wiper arm attachment member 34B. To this end, the cantilevered beam 188 further includes a sub-surface 198 that cooperates with the sidewalls 164 and 166 to define an elongate track 200. The sub-surface 198 has a stand 202 adapted to operatively engage a second hook-type wiper arm attachment member 34B. The channel 186 and the elongate track 200 are adapted to cooperatively receive a second hook-type wiper arm attachment member 34B of different sizes provided that the stand 202 engages the aperture 39B of the attachment member 34B. By way of example, the coupler 72 may engage a 9×4×23 hook-type wiper arm attachment member 34B. On the other hand, the coupler 72 may engage a 7 mm or 9×3 mm hook-type wiper arm attachment member 34A where the catch 194 is capable of engaging the aperture 39A.

As shown in FIG. 10, the cantilevered beam 188 further includes a terminal end 204 that facilitates releasable engagement of both a first and second hook-type wiper arm attachment member 34A and 34B. More specifically, as the first or second hook-type wiper arm attachment member 34A or 34B contacts the catch 194 or stand 202, the cantilevered beam 188 will articulate away from the attachment member 34A or 34B and subsequently return to a substantially parallel orientation relative to the attachment member 34A or 34B once the catch 194 or stand 202 operatively engages the aperture 39A or 39B. Additionally, the terminal end 204 of the cantilevered beam 188 is adapted to be contacted by the end user to release the operative engagement between a first or second attachment member 34A or 34B and the coupler 72. More specifically, the end user will engage the terminal end 204 to articulate the cantilevered beam 188 away from the attachment member 34A or 34B, thereby releasing the catch 194 or stand 202 from the aperture 39A or 39B, and simultaneously direct the coupler 72 (more generally the wiper assembly 26) away from the wiper arm attachment member 34A or 34B. Those having ordinary skill in the art will appreciate that the terminal end 204 of the cantilevered beam 188 may include a flange or bulbous end in order to more readily facilitate the end user's ability to release the wiper arm attachment member 34A or 34B from the coupler 72.

Referring to FIGS. 8-10, the coupler 72 of the present invention may operatively engage at least two different styles or sizes of pin-type wiper arm attachment member. To this end, the coupler 72 further includes a pair of notches 206 and 208 defined within the sidewalls 164 and 166 and a substrate 210 that extends between the sidewalls 164 and 166 in parallel relation to and disposed between the land 184 and the cantilevered beam 188. The substrate 210 cooperates with the land 184 and the notches 206 and 208 to operatively receive at least two different diameter pin-type wiper arm attachment members, namely ³⁄₁₆" and ¼" diameter pin-type wiper arm attachment members. More specifically, with reference to FIGS. 8-10, the land 184 has a deck 212 adapted to move in cantilevered fashion to releasably engage a pin-type wiper arm attachment member that is inserted through the a portion of the notches 206 and 208 and between the cantilevered deck 212 and the substrate 210.

With continuing reference to FIGS. 8-10, the coupler 72 is also adapted to operatively engage at least one style of a bayonet-type wiper arm attachment member. To this end, the substrate 210 cooperates with the sidewalls 164 and 166 and the land 184 to define an elongate cavity 214 to operatively receive a bayonet-type wiper attachment member. The land 184 includes a port 216 disposed between the sidewalls 164 and 166 and adjacent the cantilevered deck 212. The port 216 functions to releasably engage a bayonet-type wiper arm attachment member having a nub. While the coupler 72 of the present invention is designed to operatively engage a bayonet-type wiper arm attachment member having a nub, those having ordinary skill in the art will appreciate that the coupler 72 may also operatively engage a screw-style bayonet-type wiper arm attachment member. In those instances where a screw-style bayonet-type wiper arm attachment member is employed, the port 216 will operatively receive the screw member secured to a threaded hole within the screw-style bayonet-type wiper arm attachment member.

The coupler 72 is preferably manufactured via injection molding and constructed from a polymer, such as plastic. However, the coupler 72 may alternatively be manufactured via cast molding and/or constructed from a lightweight metal, such as aluminum. Additionally, such innovative methods of manufacture and construction material may become known so as to provide a more cost-effective or otherwise preferable approach to construction and/or manufacture of the present invention than those disclosed above. Accordingly, such construction materials and methods of manufacture are within the scope of this invention.

The present invention provides a universal coupler assembly 66 for a beam blade type wiper assembly that is adapted to releasably engage several different wiper arm attachment members, thereby reducing the need for several different wiper assemblies at the OEM level. The universal coupler assembly 66 having a carrier 68, saddle 70 and coupler 72 of the present invention may also function as a component of a beam blade type wiper assembly replacement system. In addition, the present invention provides an interchangeable coupler assembly that can engage several different wiper arm attachment members, thereby reducing the need for multiple aftermarket beam blade wiper replacement assemblies having the same superstructure but a different, single-application, coupler assembly to reduce the costs associated with point-of-sale packaging and replacing a beam blade type wiper assembly. Accordingly, the universal coupler assembly 66 of the present invention reduces the amount of components packaged within an aftermarket beam blade type wiper assembly replacement systems. Further, the present invention simplifies the task of replacing a wiper assembly by reducing the need for multiple adapters incorporated within a single aftermarket beam blade type wiper assembly replacement system.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A universal coupler assembly for a wiper assembly comprising:
    a carrier adapted to be mounted to the wiper assembly, said carrier extending longitudinally along at least a portion of the wiper assembly, wherein said carrier includes a seat wall and a back wall extending upwardly therefrom;
    a saddle removably received and retained by said carrier, said saddle being slideably mounted from a lateral side of said carrier and including a locking mechanism to provide releasable engagement with said carrier;
    wherein the saddle includes a spring member that at least partially engages said back wall of said carrier when said saddle is retained by said carrier, and wherein the saddle includes a pair of opposed side walls spaced laterally from each other to define a channel therebetween, a pair of end walls spaced longitudinally from each other and extending laterally between the side walls, and a cross-member extending laterally between the side walls at a height higher than the end walls, and
    a coupler adapted to releasably engage the cross-member of the saddle.

2. The universal coupler assembly as set forth in claim 1, wherein said saddle can at least partially slide along said seat wall so as to be received by said carrier, and said saddle at least partially engages said back wall when retained by said carrier.

3. The universal coupler assembly as set forth in claim 1, wherein said carrier includes a pair of laterally extending side guide members, and said saddle includes a corresponding pair of side guides for engaging said side guide members so as to longitudinally position said saddle with respect to said carrier.

4. The universal coupler assembly as set forth in claim 3, wherein said side guides of said saddle include locking tangs, and said side guide members of said carrier include receiving slots, wherein said locking tangs are adapted to releasably engage said receiving slots so as to retain said saddle to said carrier such that said locking tangs and said receiving slots define said locking mechanism.

5. The universal coupler assembly as set forth in claim 3, wherein said carrier includes a center guide member disposed between said side guide members, and said saddle includes a corresponding center guide disposed between said side guides for engaging said side center guide member so as to longitudinally position said saddle with respect to said carrier.

6. The universal coupler assembly according to claim 1, wherein the coupler comprises a pair of side walls each having a nock, wherein the nocks are aligned with each other, each nock having an arcuate rest formed at its terminal end, and a locking member adapted for releasably engaging the cross member of the saddle.

7. A wiper assembly comprising:
    a wiping element adapted to contact a surface to be wiped, at least one elongated beam acting to support said wiping element, and a universal coupler assembly operatively attached to said beam and including:
    a carrier adapted to be mounted to the wiper assembly, said carrier extending longitudinally along at least a portion of the wiper assembly, wherein said carrier includes a seat wall and a back wall extending upwardly therefrom;
    a saddle removably received and retained by said carrier, said saddle being slideably mounted from a lateral side of said carrier and including a locking mechanism to provide releasable engagement with said carrier;
    wherein said saddle includes a spring member that at least partially engages said back wall of said carrier when said saddle is retained by said carrier, and wherein the saddle includes a pair of opposed side walls spaced laterally from each other to define a channel therebetween, a pair of end walls spaced longitudinally from each other and extending laterally between the side walls, and a cross-member extending laterally between the side walls at a height higher than the end walls, and
    a coupler adapted to releasably engage the cross-member of the saddle.

8. The wiper assembly as set forth in claim 7, wherein said saddle can at least partially slide along said seat wall so as to be received by said carrier, and said saddle at least partially engages said back wall when retained by said carrier.

9. The wiper assembly as set forth in claim 7, wherein said carrier includes a pair of laterally extending side guide members, and said saddle includes a corresponding pair of side guides for engaging said side guide members so as to longitudinally position said saddle with respect to said carrier.

10. The wiper assembly as set forth in claim 9, wherein said side guides of said saddle include locking tangs, and said side guide members of said carrier include receiving slots, wherein said locking tangs are adapted to releasably engage said receiving slots so as to retain said saddle to said carrier such that said locking tangs and said receiving slots define said locking mechanism.

11. The wiper assembly as set forth in claim 9, wherein said carrier includes a center guide member disposed between said side guide members, and said saddle includes a corresponding center guide disposed between said side guides for engaging said side center guide member so as to longitudinally position said saddle with respect to said carrier.

12. The wiper assembly according to claim 7, wherein the coupler comprises a pair of side walls each having a nock, wherein the nocks are aligned with each other, each nock having an arcuate rest formed at its terminal end, and a locking member adapted for releasably engaging the cross member of the saddle.

\* \* \* \* \*